O. B. SHORES.
MECHANISM FOR TRANSMITTING MOTION.
APPLICATION FILED APR. 5, 1913.
1,106,006.
Patented Aug. 4, 1914.
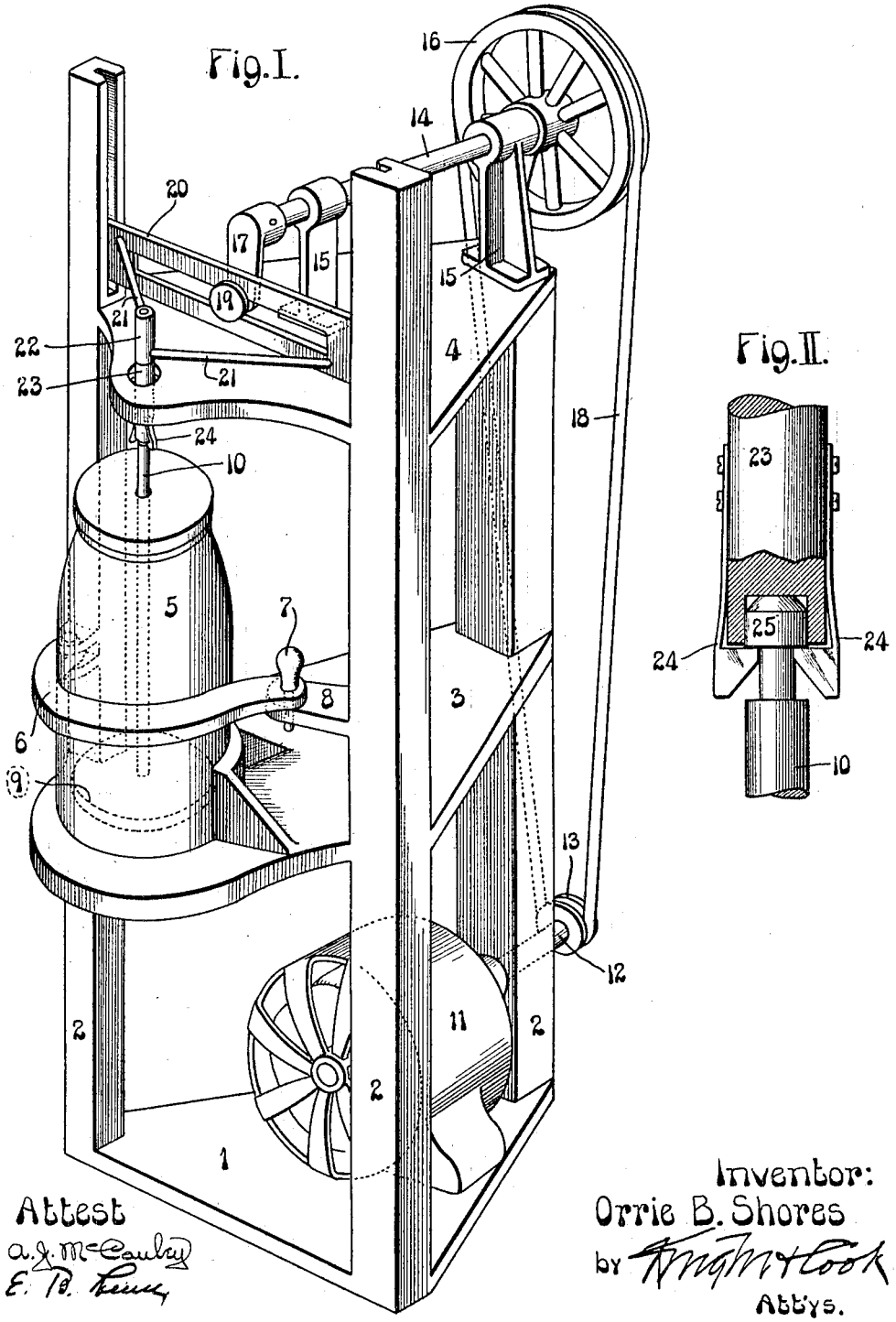
Attest
a. J. McCauley
E. B. Perry
Inventor:
Orrie B. Shores
by Wright + Cook
Attys.

UNITED STATES PATENT OFFICE.

ORRIE B. SHORES, OF ST. LOUIS, MISSOURI.

MECHANISM FOR TRANSMITTING MOTION.

1,106,006.   Specification of Letters Patent.   Patented Aug. 4, 1914.

Application filed April 5, 1913. Serial No. 759,056.

*To all whom it may concern:*

Be it known that I, ORRIE B. SHORES, a citizen of the United States of America, and a resident of the city of St. Louis, in the State of Missouri, have invented certain new and useful Improvements in Mechanism for Transmitting Motion, of which the following is a full, clear, and exact description, reference being had to the accompanying drawing, forming a part of this specification.

My invention relates to a mechanism for transmitting motion and has for its object the production of a very simple and efficient power device.

Figure I is a perspective view of a churn embodying the features of my invention. Fig. II is an enlarged detail view of the coupling for uniting the churn dasher to the power actuated device.

In the drawings: 1 designates a base plate surmounted by front and rear posts 2, to which lower and upper platforms 3 and 4 respectively are secured. The churn proper comprises a receptacle 5, removably seated against a bracket on the platform 3, and secured thereto by an arm 6 pivoted at one end to a post 2. The pivoted arm 6 partially surrounds the receptacle 5 and is held in position by a pin 7 removably mounted in said arm and passing through a lug 8 on another post 2.

The churn dasher consists of a head 9 adapted to reciprocate in the receptacle 5 and a stem 10 secured to said head.

The means for operating the dasher comprises a motor 11 mounted on the base 1 and provided with a horizontal power shaft 12 extending through the rear post 2 and having a pulley 13 on its outer end. A horizontal transmission shaft 14, passing through bearings 15, on the upper platform 4 is provided with a drive pulley 16 on its outer end and a crank 17 on its inner end.

18 is a belt or flexible connection passing around the pulleys 13 and 16.

The crank 17 is provided with a pin 19 which extends through a slot in a horizontal crosshead 20, the ends of the latter being slidably fitted to guides at the upper ends of the front posts 2. Rigid arms 21 extending laterally and converging from the crosshead 20 are attached to a sleeve 22 and a coupling rod 23 is also secured to said sleeve. The coupling rod 23 and dasher stem 10 are detachably connected together by means of a pair of inwardly projecting yieldable latch dogs 24 attached to the coupling rod 23 and adapted to interlock with a head 25 on the dasher stem.

In the practical use of my churn power is transmitted from the motor 11 to the crank shaft 14 through the medium of the flexible connection or belt 18 and the crosshead 20 reciprocates in response to rotary movements of the crank 17. The churn dasher is rigidly secured to the crosshead 20 so as to reciprocate in unison therewith.

In removing the churn proper from the platform 3 the pin 7 is withdrawn to release the churn holding arm 6 and the dasher stem 10 is released from the coupling rod 23 by disengaging the yieldable latch dogs 24 from the head 25 at the upper end of said stem.

It will be noted that the crosshead 20 is a very inexpensive device formed of sheet material which is weakened at its middle portion by the long horizontal slot. This flexible crosshead is very materially reinforced or prevented from bending at its ends, by means of the guides in the vertical posts 2, and the connecting arms 21 secured to the upper and lower portions of sleeve 22, are connected to the end portions of the inexpensive flexible crosshead at points where the latter is reinforced by the guides.

I claim:

A mechanism for transmitting motion comprising, a rotatable shaft, a crank fixed to said shaft provided with a pin, a pair of posts provided with vertical guides, a cross head 20 the ends of which are slidably fitted to said guides, said cross head 20 being formed of a sheet of thin material provided with a horizontal slot in which the pin of said crank operates, a sleeve 22 adapted to receive a reciprocating member, and a pair of converging horizontal connecting arms one of which connects the upper portion of said sleeve to the upper portion of said cross head near one end of the latter, the other connecting rod constituting a connection between the lower portion of said sleeve and the opposite end of said cross head, the sheet of thin material forming said cross head being reinforced by said guides at the points where said connecting arms are secured to the crosshead.

ORRIE B. SHORES.

In the presence of—
M. FALVEY,
A. J. McCAULEY.

Copies of this patent may be obtained for five cents each, by addressing the "Commissioner of Patents, Washington, D. C."